Aug. 30, 1932.                G. HORN                1,875,003
       MASTER OPERATOR FOR HYDRAULIC BRAKE SYSTEMS AND THE LIKE
                        Filed Nov. 2, 1928
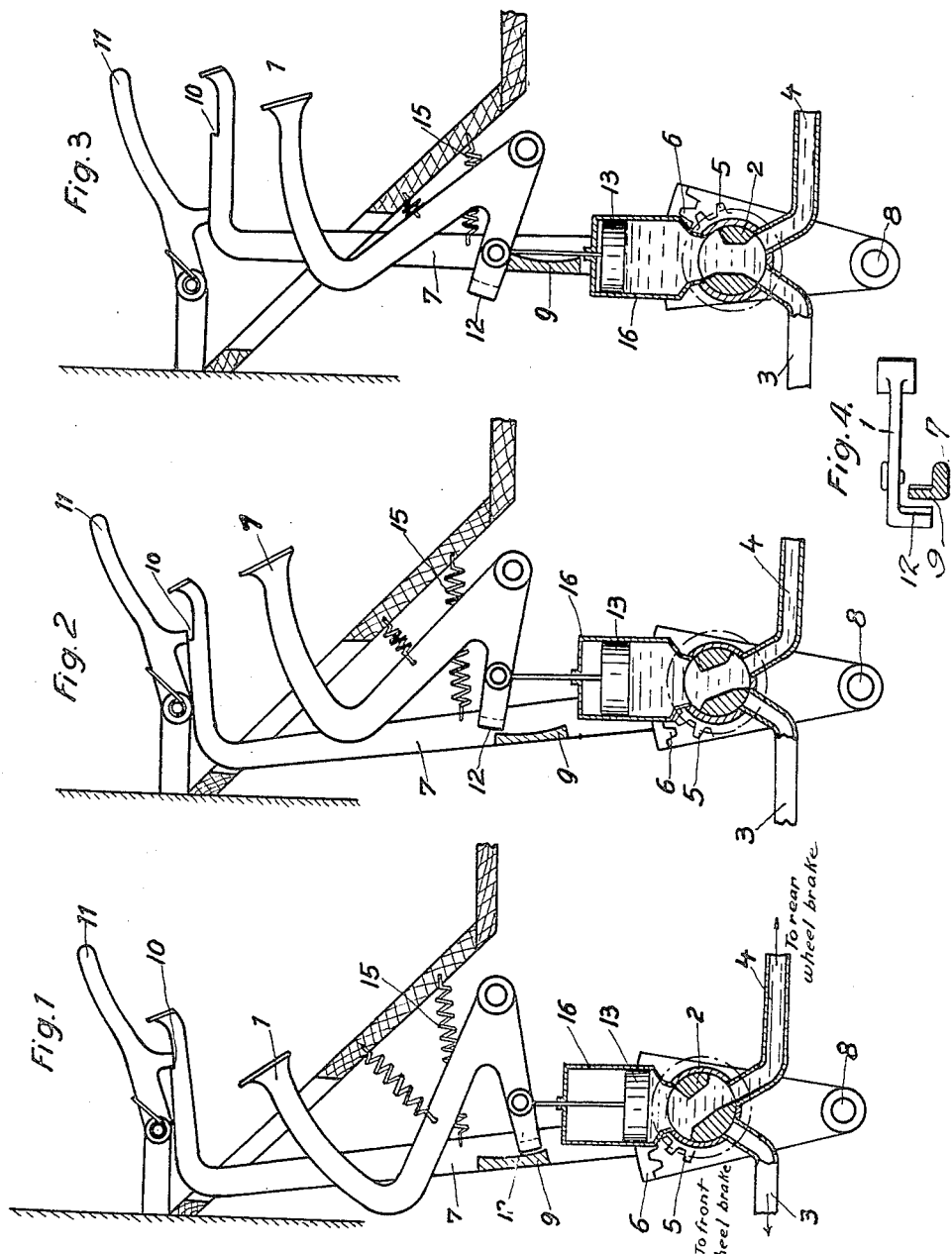

Patented Aug. 30, 1932

1,875,003

UNITED STATES PATENT OFFICE

GUIDO HORN, OF BERLIN-WEISSENSEE, GERMANY

MASTER OPERATOR FOR HYDRAULIC BRAKE SYSTEMS AND THE LIKE

Application filed November 2, 1928, Serial No. 316,824, and in Germany November 8, 1927.

This invention relates to improvements in master operators for hydraulic brake systems for vehicles, and more particularly to actuating organs for the front and rear wheel brakes of automobiles, motor cycles and the like. More particularly, this invention relates to brakes of this kind which are operated by means of liquids or fluids, such as pressure-oil, pressure-air and the like.

When simultaneously actuating the brakes for the front and rear wheel or wheels of a vehicle, there will be danger on account of the great velocity of the vehicle or on account of the slip on the road that the ability of steering the vehicle will be decreased to such an extent that the vehicle will be liable to skid.

According to this invention the connection between the operating conduits for the front wheel brake and the rear wheel brake may be released and kept in a condition of being ready to be at any time again established. As soon as during travel new conditions arise which appear to the driver dangerous to apply the brake to the front wheels, he may disengage by the aid of a special arrangement of the brake levers which forms part of my invention the connection between the front and rear wheel brake conduits and apply the brake solely to the rear wheel or wheels by actuating the usual brake levers or brake pedals. The brake for the front wheel or wheels may be actuated at any time, after the brake for the rear wheel or wheels has again been released.

The actuating elements for the brake according to my invention are designed to operate in such a manner that the valve which controls the supply of the pressure medium for the brake is so adjusted that according as to whether the front wheel or wheels are engaged or disengaged, the valve will permit the entrance of the pressure medium either only to the conduit leading to the rear wheel brake or the conduit leading to both brakes. In the accompanying drawing there is shown an illustration of a master operator for a hydraulic brake according to my present invention, Fig. 1 being a diagrammatic view, partly in section, of the master operator according to my invention showing the position of the brake controlling elements for solely actuating the brake for the rear wheel, Fig. 2 a similar view showing the position of the controlling elements of the master operator before releasing the brake for the rear wheel, Fig. 3 a similar view showing the position of said elements in case the front and rear wheel brakes are in condition of being both applied prior to the braking, and Fig. 4 a section along line 4—4 of Fig. 3 illustrating the operation of the master controller according to my present invention. In all figures of the drawing like reference characters indicate like parts.

The pressure medium for actuating the brake may be generated in any desired manner. According to the drawing there is used a cylinder 16 with a piston 13 therein, said cylinder being connected with a foot lever or brake pedal 1, while the pressure medium is controlled by means of the valve 2. The bore of said valve is so arranged that as may be seen from the position shown in Fig. 3 the conduits 3 and 4 may be simultaneously supplied with the pressure medium. The pressure medium in the conduit 3 actuates directly or indirectly the brake for the front wheel, while the pressure medium in conduit 4 will actuate the brake for the rear wheel. The valve 2 is rotatably mounted in the casing 14 and provided with a gear 5 which meshes with a toothed segment 6. This toothed segment is mounted on a further foot lever 7 which is rotatable around the point 8 and weighted by means of a spring 15. Besides, the lever 7 is provided with a stop 10 serving for the spring-weighted locking pawl 11 and a stop 9 for which there is provided a stop 12 at the brake pedal.

The mode of operation of the braking mechanism will be as follows:

In the position of the levers 1 and 7 according to Fig. 3 the brake for the front wheel and the brake for the rear wheel is engaged by exerting a pressure upon the lever 7. This lever will be brought into the position according to Fig. 1 and kept therein by means of the locking lever 11 which comes in engaging position. During this rotation of the lever 7 the valve 2 is so rotated so that the pressure medium may only discharge to the conduit 4, if the brake pedal 1 is depressed. The stops 9 and 12 now will prevent the lever 7 from moving back under the action of the spring 15 during lifting of the locking lever 11. Only after the brake lever 1 is released, which causes also the heretofore actuated brake for the rear wheel to be released, the levers 7 during lifting of the locking lever 11 may move backward and rotate the valve 2 to come into such a position that a simultaneous connection with both of said conduits 3 and 4 will be established. If in the position shown in Fig. 3 the brake pedal 1 is actuated, both the brake for the front wheel as well as the brake for the rear wheel will be applied. The mode of operation of the master operator according to my invention may be seen from Fig. 4. Details of the construction shown in the drawing may be modified to suit existing conditions.

I claim:

A master operator for hydraulic brake systems for vehicles comprising a valve, a pair of pressure conduits associated with said valve, one of said conduits leading to a front wheel brake and the other of said conduits leading to a rear wheel brake, a foot lever adapted to supply a pressure medium to said valve, a further auxiliary spring-weighted foot lever for operating said valve to permit access of said pressure medium either only to said rear wheel brake or to said rear wheel brake and said front wheel brake simultaneously, a locking lever having a stop adapted to selectively keep said auxiliary spring-weighted foot lever in releasable condition while permitting access of said pressure medium to said rear wheel brake only, and stops on both of said foot levers, said latter stops adapted to prevent said auxiliary lever when disengaged to return into its normal position before said first-mentioned foot lever has attained its position of rest.

In testimony whereof I affix my signature.

GUIDO HORN.